H. W. PLEISTER.
CONDUIT OR CABLE CLAMP AND BRIDLE RING.
APPLICATION FILED AUG. 17, 1920.
1,381,229.
Patented June 14, 1921.
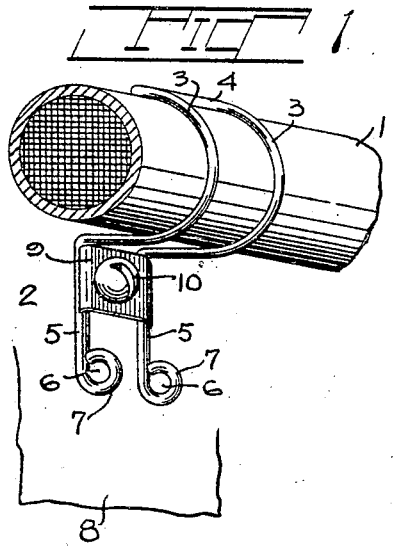
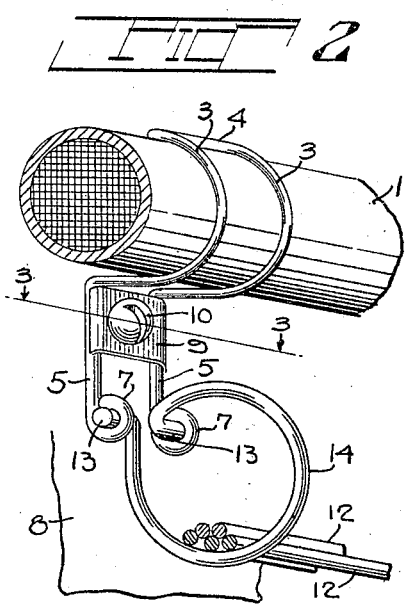
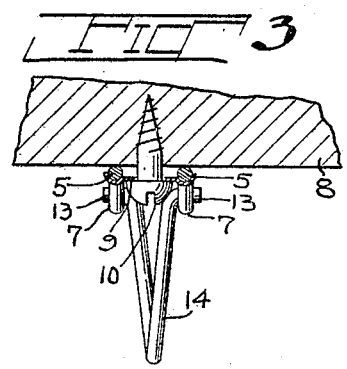
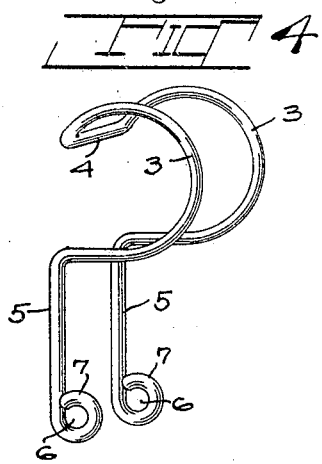
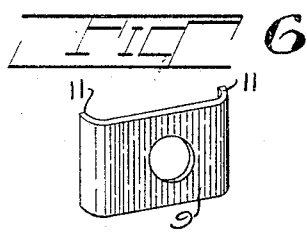
INVENTOR
Henry W Pleister
BY
Alan M Johnson
ATTORNEY

UNITED STATES PATENT OFFICE.

HENRY W. PLEISTER, OF WESTFIELD, NEW JERSEY, ASSIGNOR TO HENRY B. NEWHALL, OF PLAINFIELD, NEW JERSEY, EXECUTOR OF HENRY B. NEWHALL, SR., DECEASED.

CONDUIT OR CABLE CLAMP AND BRIDLE-RING.

1,381,229.  Specification of Letters Patent.  Patented June 14, 1921.

Application filed August 17, 1920. Serial No. 404,168.

*To all whom it may concern:*

Be it known that I, HENRY W. PLEISTER, a citizen of the United States, residing at Westfield, in the county of Union and State of New Jersey, have made certain new and useful Improvements in Conduit or Cable Clamps and Bridle-Rings, of which the following is a specification, taken in connection with the accompanying drawings.

My invention relates to a conduit or cable clamp and more particularly to one formed from wire. It further relates to a wire conduit or cable clamp as a separate article of manufacture, and to the combination of such a wire conduit or cable clamp with a saddle. My invention further relates to the combination of such a wire conduit or cable clamp and a bridle ring. My invention further relates to a wire conduit or cable clamp and a wire bridle ring.

In the figures, in which I have shown one embodiment of my invention, the same reference numerals refer to similar parts in the several figures.

Figure 1 is a perspective view of my wire conduit or cable clamp and a cable which it supports;

Fig. 2 is a perspective view of the wire conduit or cable clamp and one form of bridle ring secured to the clamp;

Fig. 3 is a horizontal section taken on the line 3—3 of Fig. 2;

Fig. 4 is a perspective view of my wire conduit or cable clamp;

Fig. 5 is a perspective view of my preferred form of bridle ring;

Fig. 6 is a perspective view of the saddle.

Prior to my invention it has been customary to support the heavy lead covered conduits or cables 1 by means of cable clamps formed from heavy castings of iron or similar metal, and also by cable clamps formed from pressed sheet steel. By my invention I form a much cheaper conduit or cable clamp which will do the heavy duty required to support the heavy lead covered cables and which will not bend or break under the heavy normal strains, nor will it fail under abnormal strains due to sleet, wind and ice.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or subcombination, and then later, when the needs of the service demands it, my bridle ring may be supported by the same conduit or cable clamp, when the complete combination would be used.

In my invention I form a wire conduit or cable clamp 2 by bending a piece of wire back upon itself to form the hooks 3, 3 connected by the member 4, the ends of the wire being separated and bent down to form the free arms 5, 5. These arms form the base of the clamp and are provided with means to support a bridle ring. I have shown by way of example, but to which my invention is not to be limited, the arms provided with bearings 6, 6 to support the particular form of bridle ring which may be used. Preferably these bearings are formed by bending the ends 7, 7 of the arms 5, 5 back upon themselves.

My wire conduit or cable clamp is secured to the wall or other suitable support 8 by means of the saddle 9 and the securing screw 10. This saddle is provided with curved ends 11, 11, which fit over the arms 5, 5 and prevent their lateral displacement.

Ordinarily when the cable 1 is supported the wire conduit or cable clamp 2 will be used simply as shown in Fig. 1. Whenever the traffic load upon the cable 1 becomes excessive and the telephone engineers do not consider it economical or good practice to take down that cable and install one of greater capacity, the increased traffic load can be carried by stringing runs of bridle wires 12, 12 by means of bridle rings. Different forms of bridle rings may be employed. In my invention the bridle ring is supported by any suitable means from the wire conduit or cable clamp.

To string these runs of bridle wires 12, 12 it is merely necessary, in my invention, to hook one of the arms 13 of the preferred form of bridle ring 14 in one of the bearings 6 on the conduit or cable clamp and compress the bridle ring so that the other arm 13 can snap into the other bearing 6. This can be done without interfering with or loosening the securing screw 10. The only additional expense is the cost of the bridle rings 14.

Should it ever be desirable at some later date, due to changes in population or changes in density of traffic, to reduce the capacity of the installation, this can be easily done by disconnecting the arms 13, 13 from the bearings 6, 6 when the bridle ring 14 and the runs of bridle wires 12, 12 can be used in some other location.

Having thus described this invention in connection with an illustrative embodiment thereof, to the details of which I do not desire to be limited, what is claimed as new and what is desired to secure by Letters Patent is set forth in the appended claims.

What I claim is:—

1. A wire conduit or cable clamp provided with a plurality of wire hooks and a plurality of wire bases, the wire bases being provided with means to coöperate with a bridle ring.

2. A wire conduit or cable clamp provided with a plurality of wire hooks and a plurality of wire bases, the wire bases being bent back on themselves to form bearings for a bridle ring.

3. The combination of a wire conduit or cable clamp provided with a plurality of wire hooks and a plurality of wire bases, the wire bases being bent back on themselves to form bearings for a bridle ring, and a saddle to secure the wire bases to a wall or other suitable support, and a bridle ring having arms adapted to coöperate with the bearings.

HENRY W. PLEISTER.

Witnesses:
MARY R. RYAN,
ELIZABETH J. ROTH.